Dec. 29, 1959  G. MALEK  2,918,854
PHOTOCELL ARRANGEMENT FOR MOVING PICTURE CAMERA
Filed March 16, 1956
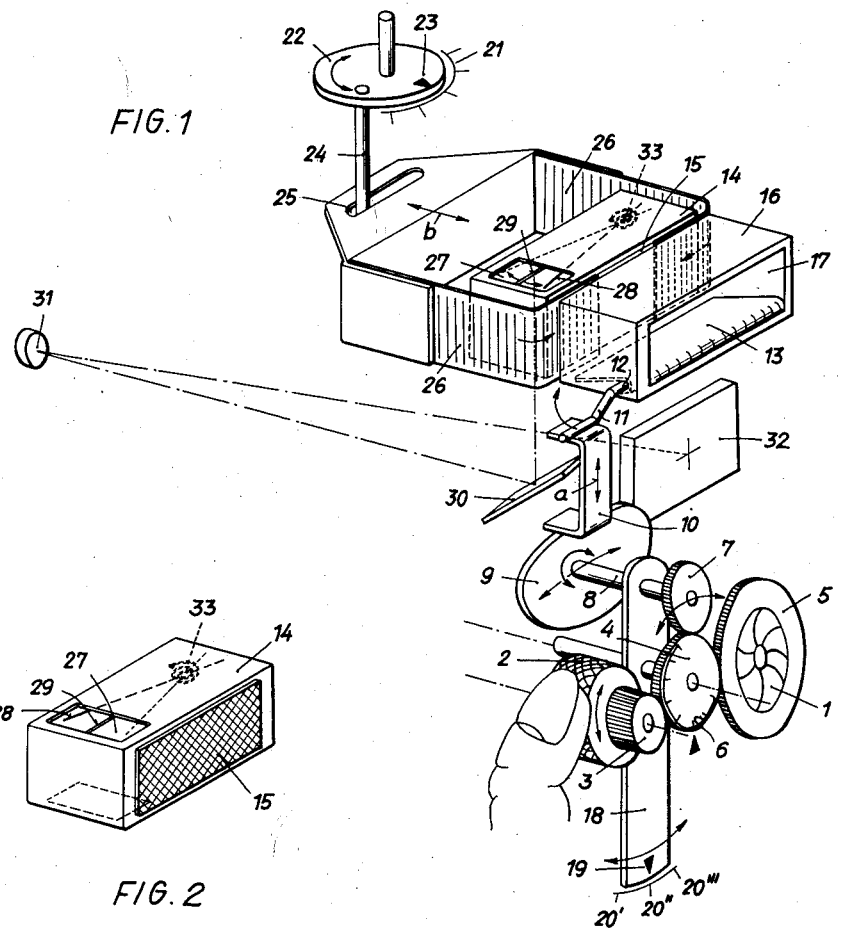
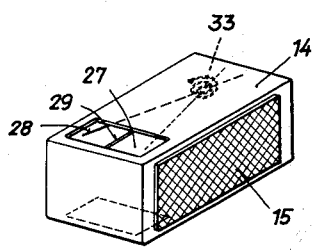
FIG. 1
FIG. 2
INVENTOR.
G. Malek
BY
ATTYS.

United States Patent Office 2,918,854
Patented Dec. 29, 1959

2,918,854

PHOTOCELL ARRANGEMENT FOR MOVING PICTURE CAMERA

Georg Malek, Vienna, Austria, assignor, by mesne assignments, to Alois Handler and Karl Vockenhuber, Vienna, Austria Application March 16, 1956, Serial No. 572,111

Claims priority, application Austria March 18, 1955

3 Claims. (Cl. 95—10)

The invention relates to a camera, particularly to a moving picture camera, having a light-sensitive indicating device, whose indication is dependent on the adjustments of the camera. Such arrangements, in which a light-sensitive indicating device, serving as an exposure meter, is built in the camera, are known per se. In such arrangements, the light-sensitive indicating device is coupled with the camera in such a manner that the pointer deflection is influenced by the adjustment of the diaphragm of the camera, the shutter or film speed. The known arrangements comprise for this purpose reference sources of light, electrical or mechanical coupling means between the light-sensitive indicating device and the setting means for the diaphragm, the shutter or film speed. In all these cases, therefore, an exact matching of the light-sensitive indicating device to the camera is required as well as complicated and delicate members ensuring such matching. Owing to the coupling of the light-sensitive indicating device with the camera, it is very difficult to replace the light-sensitive indicating device in the case of a defect; such repair can be made only in the factory in most cases.

The invention resides essentially in that in such a camera, the light-sensitive indicating device is formed as an independent, uniformly calibrated and suitably entirely self-contained set and is detachably connected to the camera and all members which influence the indication of the light-sensitive indicating device in dependence on the adjustments of the camera are arranged on the camera.

Since in such manner any coupling of the light-sensitive indicating device with the camera, more particularly to the setting members of the camera, is avoided, the light-sensitive indicating device can readily be replaced by unskilled persons. For this reason, it is no longer necessary to send the camera to the factory in the case of a defect which relates to the light-sensitive indicating device but it is sufficient simply to insert a new light-responsive indicating device. If only the condition is fulfilled that the light-sensitive indicating devices produced in series are equal within the permissible tolerance, the function of the camera will be ensured upon a replacement of the indicating device. This is not only significant for a replacement or repair of the light-sensitive indicating device but also for the manufacture of new light-sensitive indicating devices and cameras. In most cases these are made in different plants and the manufacture is much simpler if the light-sensitive cell need only be inserted into the camera than in cases where the cell must be coupled and jointly calibrated with the camera. Such a light sensitive indicating device constitutes a block, which can be inserted as such into the camera without any electrical or mechanical coupling, only elements for affixing the light-sensitive cell to or in the camera being provided.

According to the invention, all members which influence the indication of the light-sensitive indicating device in dependence on the adjustments of the camera consist of one or several shielding members, which are arranged on the camera separately of the light-sensitive indicating device and which influence the incidence of light on the light-sensitive indicating device. This is the simplest mode of influencing the light-sensitive indicating device. Whereas these shielding members are not arranged on the light-sensitive indicating device but independently thereof on the camera, they can influence that light-sensitive indicating device with the same precision as if they were directly and structurally combined therewith. In this manner the advantage of a separate arrangement of the members influencing the light-sensitive indicating device can be achieved without any disadvantage relating to the precision.

According to the invention the light-sensitive indicating device is calibrated for a single, predetermined light value and the shielding members can be adjusted to provide for that light value to indicate the correct selection of the adjustments on which the shielding members are dependent. Compared to a usual exposure meter, whose pointer moves over a scale, with different pointer positions associated with different light values, such a device calibrated for a single light value has the substantial advantage of higher precision and simpler construction. Now it is no longer necessary to calibrate the device throughout the range of deflection of the pointer and to match the complete calibration curves of the different devices with each other. It is sufficient to calibrate at one point, with easy correction. Thus such a device calibrated to a single light value fulfils the requirement of replaceability in a special degree so that the highest precision of the indication is maintained in spite of the replaceability.

Within the scope of the invention the various adjustments of the camera, such as film sensitivity, diaphragm and film speed or shutter speed may have associated therewith at least partly different, mutually independent shielding members. Thus no complicated mechanism is required for transmitting several movements in combination to the same setting member. With moving picture cameras, however, it has proved of advantage to derive the adjusting movement of one shielding member jointly from the setting member of the diaphragm and from the setting member for the film speed. This provides for a favourable construction. For instance at least one shielding member may consist according to the invention of a shield which varies the effective area of the light-sensitive cell whereas the other shielding member may consist of a shield which influences the incidence of light into a channel arranged in front of the cell. In this case it has proved suitable to control the shield which influences the incidence of light into the prearranged passage in combined dependence of the setting member for the diaphragm and of the setting member for the film speed.

According to the invention a mirror arrangement for the observation of the indicating member or pointer of the light-sensitive indicating device is provided in the field of view of the viewfinder, but outside the image field thereof, so that the agreement of the adjustment to the illumination conditions can be checked at the same time as the direction of the camera towards the object. Since the invention provides for the use of an indicating device which is calibrated to a single light value and which is to be adjusted to that single light value, the observation of the indicator or the like of the light-sensitive indicating device is much simplified because it is always sufficient to bring that indicator to a single mark. According to the invention the length of the path of light rays from the indicating member or from its image produced by an optical system to the viewfinder ocular, measured by way of any interposed optical means, is equal or approximately equal to the distance of the object image produced by the viewfinder objective from the viewfinder ocular, also measured through any interposed optical means. Hence, it is achieved that the object to be photographed and the indicating member of the light-sensitive indicating device are focussed for the viewer at the same time, without requiring an adaptation to the accommodation of the eye. The combined effect of the measures which reside in that the indicating member of the light-sensitive indicating device is brought into the field of view of the viewfinder, the light-sensitive indicating device is calibrated to a single light value and optical means are provided to equalize the distances of the virtual image of the pointer and of the object from the viewfinder ocular, ensures a particularly easy adjustment and operation of the camera with only small possibilities of error. The replaceability of the light-sensitive indicating device minimizes the possibility of breakdowns. To supplement these advantages the pointer or the like of the light-sensitive indicating instrument may move in a continuous window to appear in transmitted light. Thus the distances are equalized in which the images of the object and of the pointer appear, to facilitate the accommodation of the eye, and the intensity of light with which the pointer arrangement appears can be adapted to the intensity of light with which the object appears.

In the drawing the invention is diagrammatically illustrated by way of an exemplary embodiment.

Fig. 1 shows the adjusting mechanism of a moving picture camera whereas Fig. 2 shows the light-sensitive indicating device inserted in the moving picture camera.

The iris diaphragm 1 of the objective passage is adjusted by means of a milled handwheel 2 through the intermediary of gear wheels 3 and 4. The gear wheel 4 meshes with the gear wheel 5 of the iris diaphragm 1. The marks 6 for the adjustment of the diaphragm are provided in this case on the gear wheel 4. The gear wheel 4 meshes with a gear wheel 7, whose shaft 8 has a cam wheel 9, which acts by means of a transmitting member 10 slidably guided in the direction of the arrows $a$ on the cranked end 11 of a shaft 12, which carries a flap 13.

The light-sensitive indicating device is indicated at 14 (see also Figs. 2). The device has at its front end a light-sensitive cell 15, into which the light to be measured falls. A channel 16 is arranged in front of the cell 15. The channel is covered at the top, bottom and on both sides by opaque walls whereas its front light receiving window can be shielded by the flap 13. When the flap 13 has been swung into the horizontal position shown in the drawing the light receiving window 17 of the channel 16 is entirely open. When the flap 13 is vertically disposed the light receiving window 17 is closed. Intermediate positions of the flap provide for intermediate values of light incidence.

If the flap 13 is to be adjusted only in dependence on the setting of the objective diaphragm 1, the positions of the flap 13 will have an empirically determinable relation only to the diaphragm adjustment. In the illustrative embodiment shown in the drawing the position of the flap 13 is dependent also on the film speed of the moving picture camera. The film speed is varied by a pivotal movement of a rocker 18. The rocker 18 carries a mark 19, which is brought into registration with the various marks 20', 20'', 20'''. The shaft 8 of the gear wheel 7 and of the cam wheel 9 is rotatably mounted in the rocker 18. A pivotal movement of the rocker 18 will, therefore, cause a movement of the gear wheel 7 around the gear wheel 4 and a rotation of the cam wheel. The arrangement is such that an opening movement of the flap 13 corresponds both to an opening movement of the objective diaphragm 1 and to a reduction of the film speed.

The drawing shows also the possibility of taking the sensitivity of the film into account. The sensitivity of the film, shown on the scale 21, is adjusted by turning a disc 22 having a mark 23. An eccentric pin 24 of the disc enters a slot 25 of a slide guided in the direction of the arrow $b$. Upon a displacement of the slide the light-sensitive cell 15 will be more or less covered by louvres 26 in accordance with the film sensitivity. The scale 21 may be replaceably arranged and may show the values usual in various countries for the film sensitivity. In the case of a higher film sensitivity the louvre 26 is displaced to increase the effective area of the light-sensitive cell 15. Since the one shielding member, consisting of the louvre 26, is disposed directly at the light-sensitive cell 15 and varies the effective area thereof, whereas, the shielding member formed by the flap 13 is spaced in front of the light-sensitive cell 15 and varies the incidence of light into the channel 16 arranged before the cell, these two shielding members 13 and 26 having independent effects. This causes an adaptation of the influence on the light incidence on the light-sensitive indicating device to the picture-taking conditions of the camera as modified by the various adjustments so as to enable a direct, correct conclusion from the indication of the light-sensitive indicating device to the actual picture-taking conditions of the camera.

The light-sensitive indicating device 14 has an observation window 27 which extends therethrough from top to bottom and in which a pointer 28 moves around a zero mark 29. The adjustment is correct if the pointer 28 is on the zero mark 29. This can be observed in a mirror 30, which lies in the field of view of the viewfinder ocular 31 but outside the image field 32 of the viewfinder. Thereby the operator of the camera has before his eye at the same time the image and the light value adjustment and can always observe that the adjustments are correctly maintained. In practice only the diaphragm is varied during the various shots so that it is relatively simple to bring the pointer 28 to the zero mark 29 by a variation of the diaphragm adjustment. The arrangement is such that owing to the interposition of optical means the distance of the virtual image of the pointer 28 or of the mark 29 from the eye of the observer or from the viewfinder ocular 31 appears to be equal to the distance of the virtual image of the object produced by the viewfinder objective 32. Thus, the eye of the observer can accommodate at the same time to the object and to the pointer 28.

The light-sensitive indicating device 14 may be arranged in any desired manner in the camera. It appears suitable to provide locating members, such as pins or the like, in the body of the camera, which engage holes of the light-sensitive indicating device 14 to maintain the same properly in position. In the illustrative embodiment shown in the drawing the light-sensitive indicating instrument 14 is arranged so that the axis 33 of the pointer 28 is vertical, which enables a better control of the bearing friction and an increase of the sensitivity of the indication.

What I claim is:

1. In a moving picture camera, a light-sensitive indicating unit defined by a photoelectric cell and an actuating indicating means cooperable therewith, a common housing in which the photoelectric cell and indicating means are arranged, a diaphragm fixed on the camera, means for varying the diaphragm aperture, means for controlling the incidence of light onto the photoelectric cell, and means coupling the varying means and controlling means, the said common housing being detachably mounted in the camera independently of said varying and controlling means thereby avoiding mechanical and electrical couplings to said means.

2. In a moving picture camera, a light-sensitive indicating unit defined by a photoelectric cell and an actuating indicating means cooperable therewith, a common housing in which the photoelectric cell and indicating means are arranged, a diaphragm fixed on the camera, means for varying the diaphragm aperture, two different means for controlling the incidence of light onto the photoelectric cell, one of said means being a shield movable over the area of the cell to vary the effective area thereof, the other of said means being a channel means located in front of the photoelectric cell, and a flap means located within the channel means, and means coupling the means for varying the diaphragm aperture and one of said controlling means, the said common housing being detachably mounted in the camera independently of said varying and controlling means thereby avoiding mechanical and electrical couplings to said means.

3. In a moving picture camera, a light-sensitive indicating unit defined by a photoelectric cell and an actuating indicating means cooperable therewith, a common housing in which the photoelectric cell and indicating means are arranged, a diaphragm fixed on the camera, means for controlling the incidence of light onto the photoelectric cell including a channel means and a flap means located within the channel means, a cam wheel operably connected to said flap means to turn said flap means, a rocker supporting the cam wheel, a gear for adjusting the diaphragm aperture, said rocker being pivotably movable on the axis of the gear, and adjustable in dependence on the film speed, and a further gear connected to the cam wheel and meshing with the first named gear, the said common housing being detachably mounted in the camera independently of said controlling means and said gear for adjusting the diaphragm aperture thereby avoiding mechanical and electrical couplings to said means.

References Cited in the file of this patent

UNITED STATES PATENTS

| | | |
|---|---|---|
| 2,080,055 | Martin | May 11, 1937 |
| 2,178,361 | Riepert | Oct. 31, 1939 |
| 2,185,934 | Tonnies | Jan. 2, 1940 |
| 2,186,616 | Mihalyi | Jan. 9, 1940 |
| 2,194,152 | Riszdorfer | Mar. 19, 1940 |

FOREIGN PATENTS

| | | |
|---|---|---|
| 455,774 | Great Britain | Oct. 19, 1936 |
| 884,531 | France | Apr. 27, 1943 |